(12) United States Patent
Kuzuma et al.

(10) Patent No.: US 8,899,500 B2
(45) Date of Patent: Dec. 2, 2014

(54) GAS FUEL INJECTION VALVE

(75) Inventors: Toshinori Kuzuma, Miyagi (JP); Takashi Yoshida, Miyagi (JP); Wataru Sato, Miyagi (JP); Yoji Nakajima, Miyagi (JP)

(73) Assignee: Keihin Corporation, Tokyo (JP)

( * ) Notice: Subject to any disclaimer, the term of this patent is extended or adjusted under 35 U.S.C. 154(b) by 517 days.

(21) Appl. No.: 13/259,097

(22) PCT Filed: Mar. 17, 2010

(86) PCT No.: PCT/JP2010/054566
§ 371 (c)(1),
(2), (4) Date: Sep. 22, 2011

(87) PCT Pub. No.: WO2010/113645
PCT Pub. Date: Oct. 7, 2010

(65) Prior Publication Data
US 2012/0018541 A1  Jan. 26, 2012

(30) Foreign Application Priority Data

Mar. 30, 2009 (JP) ................................. 2009-083536
Mar. 30, 2009 (JP) ................................. 2009-083538

(51) Int. Cl.
| | | |
|---|---|---|
| F02M 61/00 | (2006.01) | |
| F02M 51/00 | (2006.01) | |
| B05B 1/26 | (2006.01) | |
| F02M 61/18 | (2006.01) | |
| F02M 21/02 | (2006.01) | |
| F02M 51/06 | (2006.01) | |

(52) U.S. Cl.
CPC ....... *F02M 21/0281* (2013.01); *F02M 2200/04* (2013.01); *F02M 61/1833* (2013.01); *Y02T 10/32* (2013.01); *F02M 21/0254* (2013.01); *F02M 51/0682* (2013.01); *F02M 61/1846* (2013.01); *F02M 21/0266* (2013.01)
USPC ... 239/533.12; 239/499; 239/518; 239/533.3; 239/585.1

(58) Field of Classification Search
CPC .............. F02M 61/18; F02M 61/1806; F02M 61/1833; F02M 61/1846
USPC .............. 239/499, 518, 533.2, 533.3, 533.12, 239/584, 585.1, 585.4
See application file for complete search history.

(56) References Cited

U.S. PATENT DOCUMENTS 4,395,988 A * 8/1983 Knapp et al. ................... 123/469

(Continued)

FOREIGN PATENT DOCUMENTS

| CN | 101375047 A | 2/2009 |
|---|---|---|
| DE | 10 2007 000 701 A1 | 4/2008 |

(Continued)

*Primary Examiner* — Ryan Reis
(74) *Attorney, Agent, or Firm* — Arent Fox LLP

(57) ABSTRACT

A gas fuel injection valve is provided in which a single nozzle member (11) is fixedly provided in a front end part of a valve housing (2), and this nozzle member (11) has formed therein a valve seat (13), a valve hole (45) extending through a central part of the valve seat (13), a throttle hole (46) having a smaller diameter than that of the valve hole (45) and communicating with an outlet of the valve hole (45), and a nozzle hole (48) having a larger diameter than that of the throttle hole (46) and communicating with an outlet of the throttle hole (46), wherein when an internal diameter of the throttle hole (46) is D1, a length of the hole (46) is L1, an internal diameter of the nozzle hole (48) is D2, and a length of the nozzle hole (48) is L2, $$L1/D1 > 1 \qquad (1)$$

$$1 < D2/D1 \geq 1.2 \qquad (2)$$

the above expressions (1) and (2) are satisfied. Thus, it is possible to provide a silent gas fuel injection valve by preventing a gas fuel flow, separation phenomenon at the boundary between the throttle hole and the nozzle hole.

11 Claims, 7 Drawing Sheets

(56) References Cited

U.S. PATENT DOCUMENTS

| | | | |
|---|---|---|---|
| 4,429,674 A * | 2/1984 | Lubbing | 123/531 |
| 4,707,278 A * | 11/1987 | Breyer et al. | 251/122 |
| 5,314,122 A * | 5/1994 | Winter | 239/585.1 |
| 6,336,621 B1 * | 1/2002 | Ii et al. | 251/129.15 |
| 7,044,405 B2 * | 5/2006 | Kawazoe et al. | 239/533.12 |
| 7,735,757 B2 * | 6/2010 | Nakajima et al. | 239/533.2 |
| 2010/0116910 A1 * | 5/2010 | Girlinger et al. | 239/533.3 |

FOREIGN PATENT DOCUMENTS

| | | |
|---|---|---|
| DE | 10 2007 004 553 A1 | 7/2008 |
| EP | 1 980 740 A1 | 10/2008 |
| JP | 4 59367 U | 5/1992 |
| JP | 6-221251 A | 8/1994 |
| JP | 7-189859 A | 7/1995 |
| JP | 11-117830 A | 4/1999 |
| JP | 11-303685 A | 11/1999 |
| JP | 2002-115625 A | 4/2002 |
| JP | 2005-344639 A | 12/2005 |
| JP | 2007-40245 A | 2/2007 |
| JP | 2007-205276 A | 8/2007 |
| WO | WO 2005/040591 A1 | 5/2005 |

* cited by examiner

GAS FUEL INJECTION VALVE

CROSS-REFERENCE TO RELATED APPLICATION

This application is a National Stage entry of International Application No. PCT/JP2010/054566, filed Mar. 17, 2010, which claims priority to Japanese Patent Application Nos. 2009-083536 filed Mar. 30, 2009, and 2009-083538 filed Mar. 30, 2009, the disclosure of the prior applications are incorporated in their entirety by reference.

TECHNICAL FIELD

The present invention relates to a gas fuel injection valve for supplying to an internal combustion engine natural gas such as CNG or LPG as fuel and, in particular, to an improvement of a gas fuel injection valve in which a single nozzle member is fixedly provided in a front end part of a valve housing that has an interior thereof as a gas fuel passage and houses a valve body, and this nozzle member has formed therein a valve seat facing the gas fuel passage, a valve hole extending through a central part of the valve seat and being opened and closed by cooperation between the valve body and the valve seat, a throttle hole having a smaller diameter than that of the valve hole and communicating with an outlet of the valve hole, and a nozzle hole having a larger diameter than that of the throttle hole and communicating with an outlet of the throttle hole.

BACKGROUND ART

Such a gas fuel injection valve is already known, as disclosed in Patent Document 1 below.

PRIOR ART DOCUMENT

Patent Document

Patent Document 1: Japanese Patent Application Laid-open No. 11-303685

Conventionally, in this type of gas fuel injection valve, as shown in FIG. 7, when a valve body opens, high pressure gas fuel within a gas fuel passage passes through a valve seat and is supplied to an engine via a nozzle hole after its flow rate is metered by a throttle hole, but in the conventional arrangement since the change in flow path cross-sectional area between the throttle hole and the nozzle hole is abrupt, when gas fuel moves rapidly from the throttle hole to the nozzle hole, a flow separation phenomenon occurs at the boundary between the throttle hole and the nozzle hole, this separation phenomenon becomes a sound source, sound waves are transmitted to the nozzle hole, a resonance phenomenon is caused by interaction with the nozzle member characteristic frequency, and this becomes a jarring noise for the user.

SUMMARY OF THE INVENTION

Problems to be Solved by the Invention

The present invention has been accomplished in light of such circumstances, and it is an object thereof to provide a silent gas fuel injection valve by preventing a gas fuel flow separation phenomenon at the boundary between a throttle hole and a nozzle hole.

Means for Solving the Problems

In order to attain the above object, according to a first aspect of the present invention, there is provided a gas fuel injection valve in which a single nozzle member is fixedly provided in a front end part of a valve housing that has an interior thereof as a gas fuel passage and houses a valve body, and this nozzle member has formed therein a valve seat facing the gas fuel passage, a valve hole extending through a central part of the valve seat and being opened and closed by cooperation between the valve body and the valve seat, a throttle hole having a smaller diameter than that of the valve hole and communicating with an outlet of the valve hole, and a nozzle hole having a larger diameter than that of the throttle hole and communicating with an outlet of the throttle hole, characterized in that when an internal diameter of the throttle hole is $D1$, a length of the throttle hole is $L1$, an internal diameter of the nozzle hole is $D2$, and a length of the nozzle hole is $L2$, $$L1/D1 > 1 \quad (1)$$

$$1 < D2/D1 \leq 1.2 \quad (2)$$

the throttle hole and the nozzle hole are formed so as to satisfy expressions (1) and (2) above.

Further, according to a second aspect of the present invention, in addition to the first aspect, the throttle hole and the nozzle hole are connected to each other via a taper hole, and when an inclination angle of the taper hole is $\theta$, $$0° < \theta \leq 15° \quad (3)$$

the taper hole is formed so as to satisfy expression (3) above.

Furthermore, according to a third aspect of the present invention, there is provided a gas fuel injection valve in which a single nozzle member is fixedly provided in a front end part of a valve housing that has an interior thereof as a gas fuel passage and houses a valve body, and this nozzle member has formed therein a valve seat facing the gas fuel passage, a valve hole extending through a central part of the valve seat and being opened and closed by cooperation between the valve body and the valve seat, a throttle hole having a smaller diameter than that of the valve hole and communicating with an outlet of the valve hole, and a nozzle hole having a larger diameter than that of the throttle hole and communicating with an outlet of the throttle hole, characterized in that the throttle hole and the nozzle hole are connected to each other via a taper hole, and when an internal diameter of the throttle hole is $D1$, a length of the throttle hole is $L1$, and an inclination angle of the taper hole is $\theta$, $$L1/D1 > 1 \quad (1)$$

$$0° < \theta \leq 15° \quad (3)$$

the throttle hole, the nozzle hole, and the taper hole are formed so as to satisfy expressions (1) and (3) above.

Moreover, according to a fourth aspect of the present invention, in addition to the third aspect, when the internal diameter of the throttle hole is $D1$ and an internal diameter of the nozzle hole is $D2$, $$1 < D2/D1 \leq 1.2 \quad (2)$$

the throttle hole and the nozzle hole are formed so as to satisfy expression (2) above.

Further, according to a fifth aspect of the present invention, there is provided a gas fuel injection valve in which a single nozzle member is fixedly provided in a front end part of a valve housing that has an interior thereof as a gas fuel passage and houses a valve body, and this nozzle member has formed therein a valve seat facing the gas fuel passage, a valve hole extending through a central part of the valve seat and being opened and closed by cooperation between the valve body and the valve seat, a throttle hole having a smaller diameter than that of the valve hole and communicating with an outlet of the valve hole, a nozzle hole having a larger diameter than that of the throttle hole and communicating with an outlet of the throttle hole, and a taper hole providing a connection between the throttle hole and the nozzle hole, characterized in that the throttle hole and the nozzle hole are disposed so as to be eccentric to each other, and when an inclination angle of the taper hole (49) is θ, $$0°<\theta\leq15° \quad (3)$$

the taper hole (49) is formed so as to satisfy expression (3) above.

Moreover, according to a sixth aspect of the present invention, in addition to the fifth aspect, when an internal diameter of the throttle hole is D1, a length of the throttle hole is L1, an internal diameter of the nozzle hole is D2, and a length of the nozzle hole is L2, $$L1/D1>1 \quad (1)$$

$$1<D2/D1\leq1.2 \quad (2)$$

the throttle hole and the nozzle hole are formed so as to satisfy expressions (1) and (2) above.

Effects of the Invention

In accordance with the first aspect of the present invention, by satisfying expression (1) above it is possible to straighten gas fuel flow at the throttle hole, stabilize metering of the fuel flow rate, and minimize a flow separation phenomenon when moving from the throttle hole to the nozzle hole, by satisfying expression (2) above it is possible to suppress effectively a flow separation phenomenon, and consequently cavitation, when gas fuel moves from the throttle hole to the nozzle hole, and in accordance with the above it is possible to prevent noise from being generated within the nozzle hole and provide a silent gas fuel injection valve.

In accordance with the second aspect of the present invention, by satisfying expression (3) above it is possible for the taper hole to smoothly transfer gas fuel from the throttle hole to the nozzle hole without causing separation, and it is possible to further prevent noise from being generated within the nozzle hole and provide a more silent gas fuel injection valve.

In accordance with the third aspect of the present invention, by satisfying expression (1) above it is possible to straighten gas fuel flow at the throttle hole, stabilize metering of the fuel flow rate, and minimize a flow separation phenomenon when moving from the throttle hole to the nozzle hole, by satisfying expression (3) above it is possible for the taper hole to smoothly transfer gas fuel from the throttle hole to the nozzle hole without causing separation, and in accordance with the above it is possible to prevent noise from being generated within the nozzle hole and provide a silent gas fuel injection valve.

In accordance with the fourth aspect of the present invention, by satisfying expression (2) above it is possible to suppress effectively a flow separation phenomenon, and consequently cavitation, when gas fuel moves from the throttle hole to the nozzle hole, and in accordance with the above it is possible to further prevent noise from being generated within the nozzle hole and provide a more silent gas fuel injection valve.

In accordance with the fifth aspect of the present invention, since the taper hole is eccentric to the nozzle hole by a predetermined amount, portions, opposing in the direction of eccentricity, of an inner peripheral face of the taper hole are offset by a constant distance in the axial direction of the taper hole, sound waves due to gas fuel flow separation are generated from these opposing portions, a phase displacement is caused between incoming waves transmitted to the nozzle hole from these opposing portions, interference therebetween enables the occurrence of a stationary wave to be prevented, and it is possible to suppress effectively emission of noise from the nozzle hole, thus contributing to the provision of a silent gas fuel injection valve.

Additionally, by satisfying expression (4) above it is possible for the taper hole to smoothly transfer gas fuel from the throttle hole to the nozzle hole while suppressing separation, thus preventing more effectively the generation of noise within the nozzle hole.

In accordance with the sixth aspect of the present invention, by satisfying expression (5) above it is possible to straighten gas fuel flow at the throttle hole, stabilize metering of the fuel flow rate, and minimize a flow separation phenomenon when moving from the throttle hole to the nozzle hole and, furthermore, by satisfying expression (6) above it is possible to suppress effectively a flow separation phenomenon, and consequently cavitation, when gas fuel moves from the throttle hole to the nozzle hole, thus preventing more effectively the generation of noise within the nozzle hole.

EXPLANATION OF REFERENCE NUMERALS AND SYMBOLS

Figure 1:
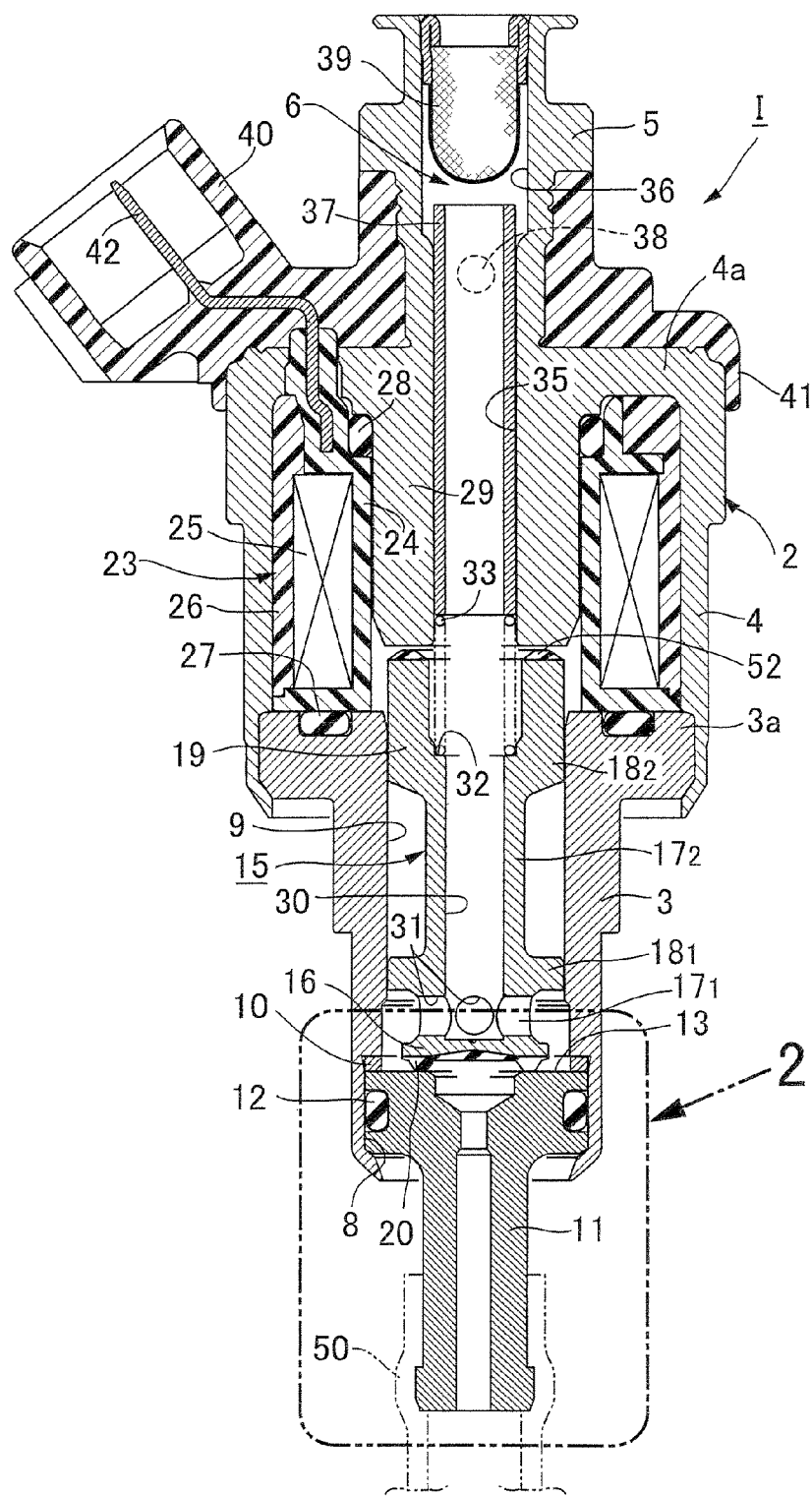
FIG. 1 is a vertical sectional view of a gas fuel injection valve related to a first embodiment of the present invention. (first embodiment)

I gas fuel injection valve
2 valve housing
6 gas fuel passage
11 nozzle member
13 valve seat
14 nozzle hole
15 valve body
45 valve hole
46 throttle hole
48 nozzle hole
49 taper hole

MODES FOR CARRYING OUT THE INVENTION

Modes for carrying out the present invention are explained below by reference to preferred embodiments of the present invention shown in the attached drawings.

Figure 2:
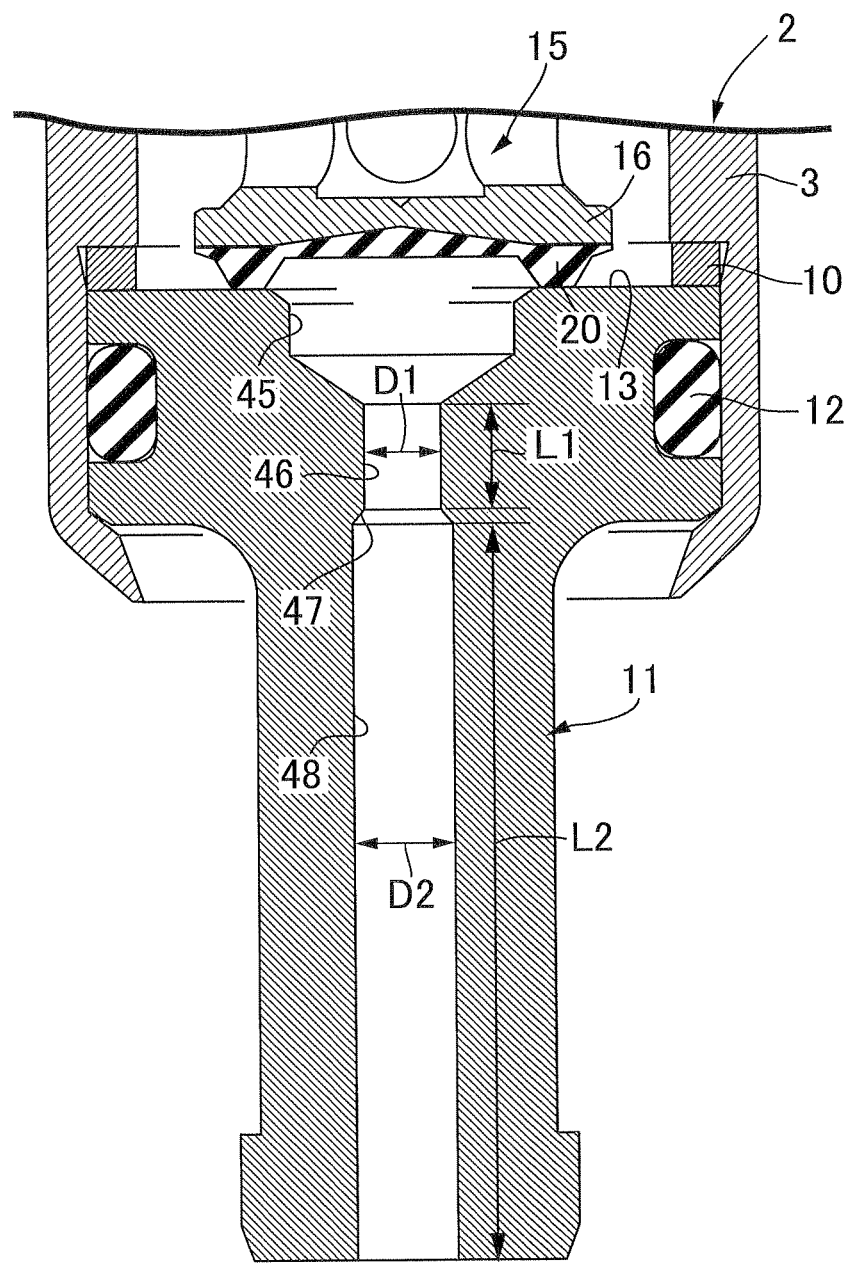
FIG. 2 is an enlarged view of part 2 in FIG. 1. (first embodiment)

A first embodiment of the present invention shown in FIG. 1 and FIG. 2 is now explained.

Embodiment 1

In FIG. 1, a gas fuel injection valve I related to the present invention includes a valve housing 2 formed from a cylindrical first housing part 3, a cylindrical second housing part 4 having its front end part connected by swaging to a flange 3a at the rear end of the first housing part 3 and having a larger diameter than that of the first housing part 3, and a cylindrical third housing part 5 provided integrally with a rear end wall 4a of the second housing part 4 and having a smaller diameter than that of the second housing part 4, the interior of the valve housing 2 being a gas fuel passage 6. All of the first to third housing parts 3 to 5 are formed from a magnetic material.

Formed in a coaxial manner in the first housing part 3 are a mounting hole 8 opening at the front end thereof and a guide hole 9 opening at the rear end thereof and being smaller in diameter and longer in length than the mounting hole 8, and fitted in sequence into the mounting hole 8 are an annular shim 10 and a disc-shaped nozzle member 11, which are fixed by swaging the front edge of the first housing part 3 inward. During this process, an annular seal member 12 is fitted around the outer periphery of the nozzle member 11, the seal member 12 being in intimate contact with an inner peripheral face of the mounting hole 8. The position at which the nozzle member 11 is fitted is adjusted by selecting the thickness of the annular shim 10.

As shown in FIG. 2, the nozzle member 11 is provided with a valve seat 13 facing the gas fuel passage 6, a valve hole 45 extending through a central part of the valve seat 13, a throttle hole 46 communicating with an outlet of the valve hole 45 and having a smaller diameter than that of the valve hole 45, and a nozzle hole 48 communicating with an outlet of the throttle hole 46 via an annular step part 47 and having a larger diameter than that of the throttle hole 46.

When an internal diameter of the throttle hole 46 is D1, a length of the throttle hole 46 is L1, an internal diameter of the nozzle hole 48 is D2, and a length of the nozzle hole 48 is L2, $$L1/D1 > 1 \quad (1)$$

$$1 < D2/D1 \leq 1.2 \quad (2)$$

the throttle hole 46 and the nozzle hole 48 are formed so as to satisfy expressions (1) and (2) above.

Referring again to FIG. 1, a valve body 15 is slidably housed and retained in the guide hole 9. This valve body 15 is formed from a plunger 19 and a seating member 20 made of rubber, the plunger 19 being formed by integrally and coaxially connecting from the front end side a flange part 16, a short shaft part 17₁, a first journal part 18₂, a long shaft part 17₂, and a second journal part 18₂, the seating member 20 being connected to a front end face of the flange part 16 by baking, and this seating member 20 being seated on or detached from the valve seat 13 so as to close and open the valve hole 45. The plunger 19 is made of a magnetic material so as to function as a movable core.

In the plunger 19, the short shaft part 17₁ and the long shaft part 17₂ are formed so as to have a sufficiently smaller diameter than that of the first and second journal parts 18₁ and 18₂, and the first and second journal parts 18₁ and 18₂ are both slidably supported by the guide hole 9.

Housed in the second housing part 4 is a coil assembly 23. This coil assembly 23 is formed from a bobbin 24, a coil 25 wound around the outer periphery of the bobbin 24, and a resin molding part 26 for encapsulating the coil 25 in the bobbin 24, an annular seal member 27 being disposed between the bobbin 24 and the flange 3a of the first housing part 3.

A cylindrical fixed core 29 fitted to an inner peripheral face of the bobbin 24 is integrally formed with the rear end wall 4a of the second housing part 4, and a seal member 28 for sealing the joint therebetween is disposed between the bobbin 24 and the fixed core 29. The plunger 19 has its rear end part projecting into the bobbin 24 and opposing a front end face of the fixed core 29.

Provided in the plunger 19 are a lengthwise hole 30 extending from its rear end face up to just before the flange part 16 and a plurality of sideways holes 31 providing communication between the lengthwise hole 30 and an outer peripheral face of the short shaft part 17₁. In this arrangement, an annular spring seat 32 facing the fixed core 29 side is formed partway along the lengthwise hole 30.

On the other hand, a support hole 35 communicating with the lengthwise hole 30 is formed from the fixed core 29 to a front half part of the third housing part 5 in their central parts, and an inlet hole 36 communicating with the support hole 35 and having a larger diameter than that of the support hole 35 is provided in a rear half part of the third housing part 5. A pipe-shaped retainer 37 is inserted into the support hole 35, the pipe-shaped retainer 37 supporting between itself and the spring seat 32 a return spring 33 urging the valve body 15 toward the valve seat 13 side, and after adjusting the set load for the return spring 33 by adjusting the insertion depth of the retainer 37, the retainer 37 is fixed to the third housing part 5 by swaging the outer periphery of the third housing part 5. Reference numeral 38 denotes the swaged part. A fuel filter 39 is fitted into the inlet hole 36. A gas fuel distribution pipe (not illustrated) is connected to a rear end part of the third housing part 5 so that gas fuel is distributed to the inlet hole 36. Connected to the nozzle member 11 is a gas fuel guide pipe 50 for guiding fuel injected via the nozzle hole 48 to an appropriate location in the engine.

A resin molding part 41 is formed from a rear end part of the second housing part 4 to the front half part of the third housing part 5, the resin molding part 41 covering the outer peripheral faces thereof and being provided integrally with a coupler 40 on one side, and the coupler 40 retaining an energization terminal 42 connected to the coil 25.

Furthermore, an annular cushion member 52, made of rubber, is joined by baking to a rear end face of the valve body 15, the cushion member 52 opposing a front end face of the fixed core 29.

The operation of the first embodiment is now explained.

When the coil 25 is in a de-energized state, the valve body 15 is pressed forward by means of the urging force of the return spring 33, and the seating member 20 is seated on the valve seat 13. In this state, gas fuel that has been fed from a gas fuel tank, which is not illustrated, to the distribution pipe flows into the inlet hole 36 of the valve housing 2, is filtered by the fuel filter 39, passes through the interior of the pipe-shaped retainer 37 and the lengthwise hole 30 and sideways holes 31 of the valve body 15, and is held in readiness within the guide hole 9.

When the coil 25 is energized by the passage of current, magnetic flux generated thereby runs in sequence through the fixed core 29, the second housing part 4, the flange 3a, and the valve body 15, the valve body 15 is attracted toward the fixed core 29 by means of the magnetic force against the set load of the return spring 33, and the rubber cushion member 52 of the valve body 15 abuts against the front end face of the fixed core 29, thereby restricting the limit of opening of the seating member 20 relative to the valve seat 13.

In this way, when the valve body 15 is opened, gas fuel that has been held in readiness in the guide hole 9 passes through the valve seat 13, its flow rate is metered by the throttle hole 46, it then rapidly flows into the nozzle hole 48, and it is supplied to the engine through the gas fuel guide pipe 50.

Forming the throttle hole 46 and the nozzle hole 48 so as to satisfy expression (1) above involves setting the length L1 of the throttle hole 46 larger than the internal diameter D1 of the throttle hole 46, thereby making it possible to straighten the flow of fuel in the throttle hole 46, stabilize the metering of the fuel flow rate, and minimize the occurrence of a flow separation phenomenon in the step part 47 when moving to the nozzle hole 48.

Furthermore, forming the throttle hole 46 and the nozzle hole 48 so as to satisfy expression (2) above involves setting the ratio of the internal diameter D2 of the nozzle hole 48 relative to the internal diameter D1 of the throttle hole 46 at greater than 1 but no greater than 1.2, thereby making it possible to suppress effectively the occurrence of a flow separation phenomenon, and consequently cavitation, in the step part 47 when moving to the nozzle hole 48.

As hereinbefore described, the generation of noise within the nozzle hole 48 can be prevented, and a silent gas fuel injection valve I can be provided.

Figure 3:
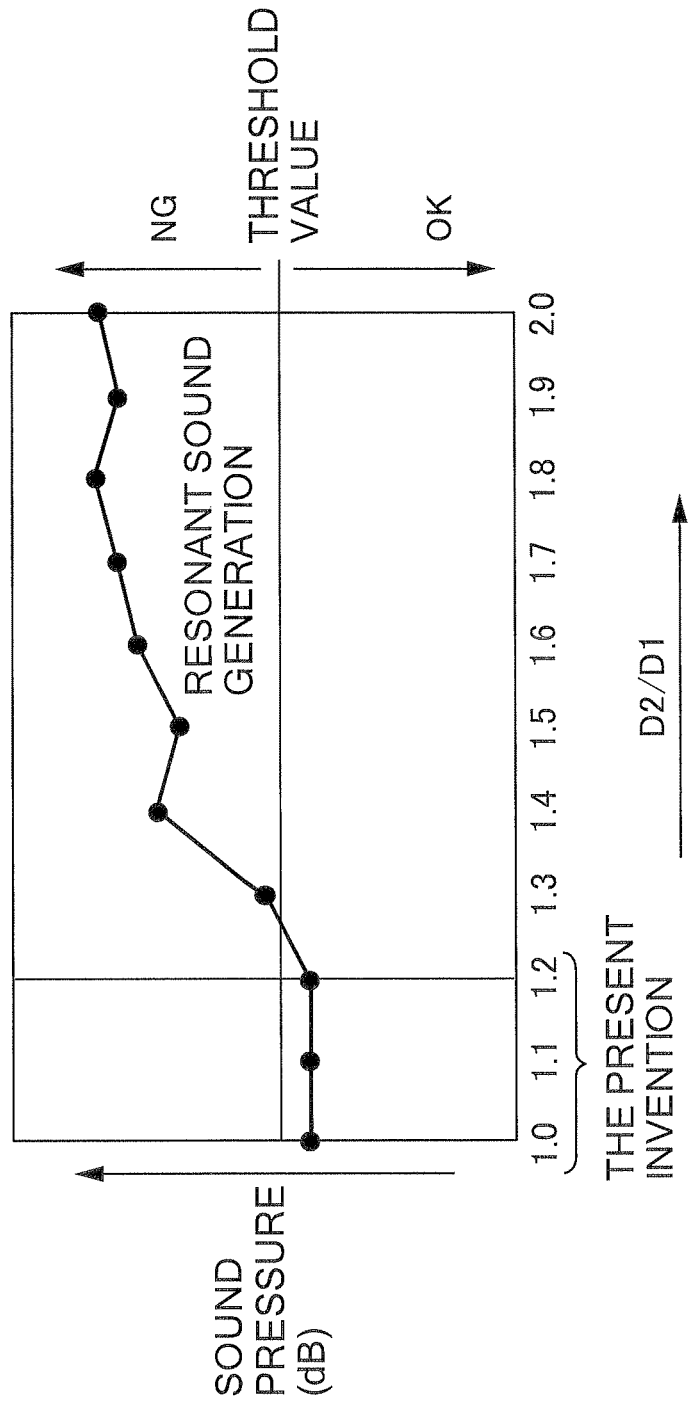
FIG. 3 is a plot showing the results of a noise sound pressure test of the first embodiment. (first embodiment)

FIG. 3 shows the test results when examining the relationship between D2/D1 above and noise sound pressure measured at the outlet of the nozzle member 11. As is clear from the test results, the noise sound pressure is relatively low when D2/D1 is in the range of 1.0 to 1.2, but when D2/D1 exceeds 1.2, it increases. Furthermore, when D2/D1=1, the metering function of the throttle hole 46 is lost. Expression (1) above is based on these test results.

Figure 4:
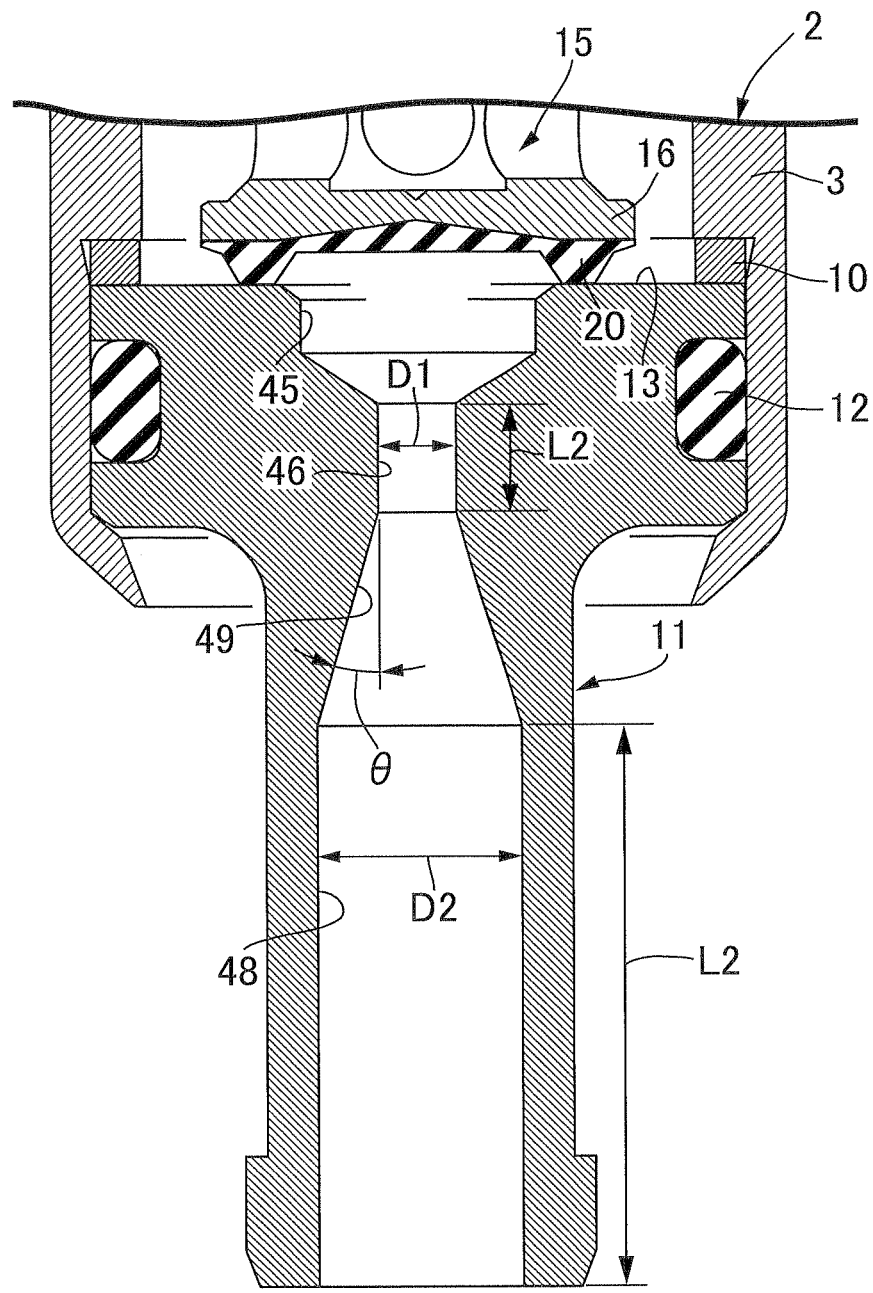
FIG. 4 is a view, corresponding to FIG. 2, showing a second embodiment of the present invention. (second embodiment)

A second embodiment of the present invention shown in FIG. 4 is now explained.

Embodiment 2

In this second embodiment, in addition to the arrangement of the above embodiment, a connection is provided between a throttle hole 46 and a nozzle hole 48 via a taper hole 49. In this arrangement, an inclination angle θ of the taper hole 49 is set so as to satisfy expression (3) below.

$$0° < \theta \leq 15°$$  (3)

In FIG. 4, parts with the same component as that of the embodiment above are designated by the same reference numerals and symbols, and duplication of the explanation is omitted.

Figure 5:
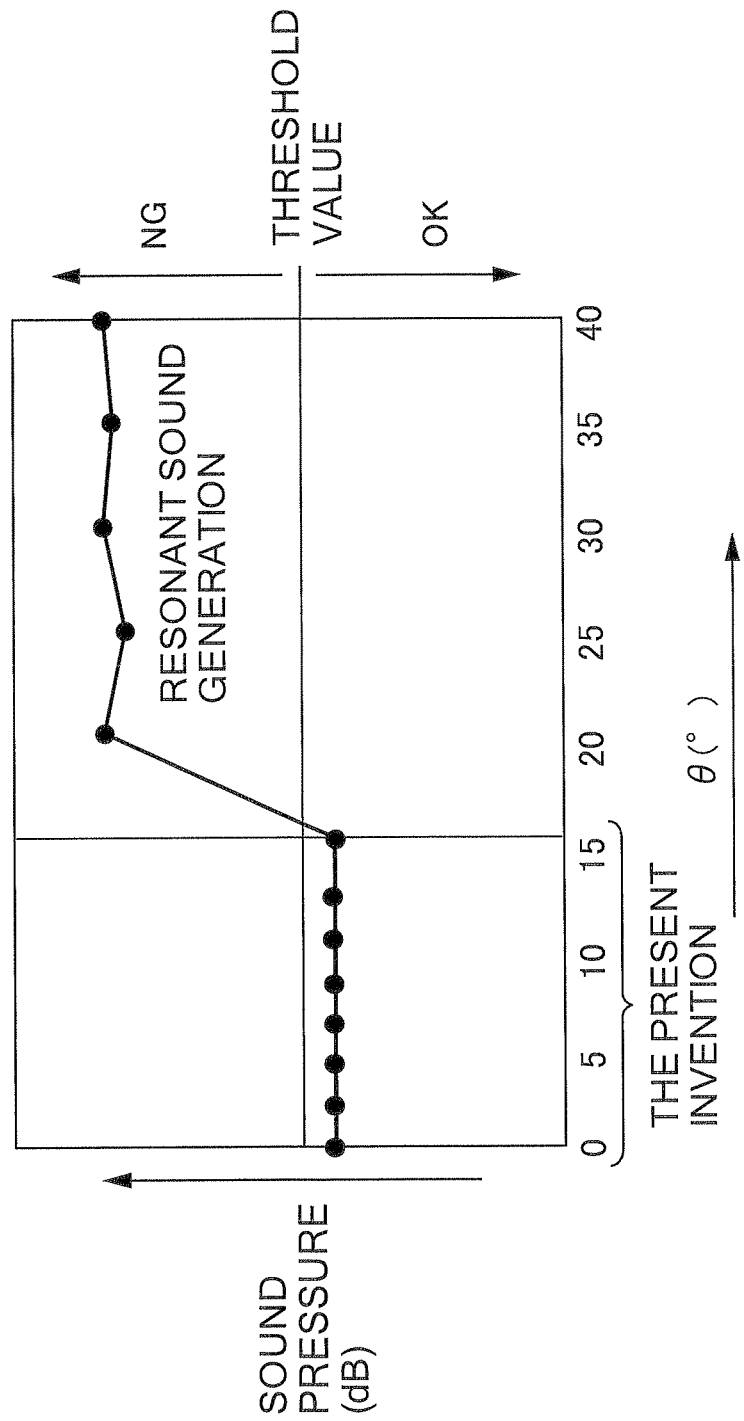
FIG. 5 is a plot showing the results of a noise sound pressure test of the second embodiment. (second embodiment)

FIG. 5 shows the test results when examining the relationship between θ above and noise sound pressure measured at the outlet of a nozzle member 11. As is clear from the test results, the noise sound pressure is very low when θ is in the range of 0° to 15°, but rapidly increases when θ exceeds 15°. That is, when θ is in the range of 0° to 15°, the taper hole 49 transfers gas fuel from the throttle hole 46 to the nozzle hole 48 smoothly without causing separation, and the noise sound pressure is therefore very low; when the taper hole 49 exceeds 15°, the smooth guiding function of the taper hole 49 is lost, separation occurs in the flow, the separation phenomenon becomes a sound source, the sound waves are transmitted to the nozzle hole 48, resonance is caused due to interaction with the characteristic frequency of the nozzle member 11, and the noise sound pressure therefore increases. Furthermore, when θ=0°, the metering function of the throttle hole 46 is lost. Expression (3) above is based on these test results.

By satisfying expressions (1) and (2) above at the same time, it becomes possible to further prevent the generation of noise within the nozzle hole 48 and provide a more silent gas fuel injection valve I.

Figure 6:
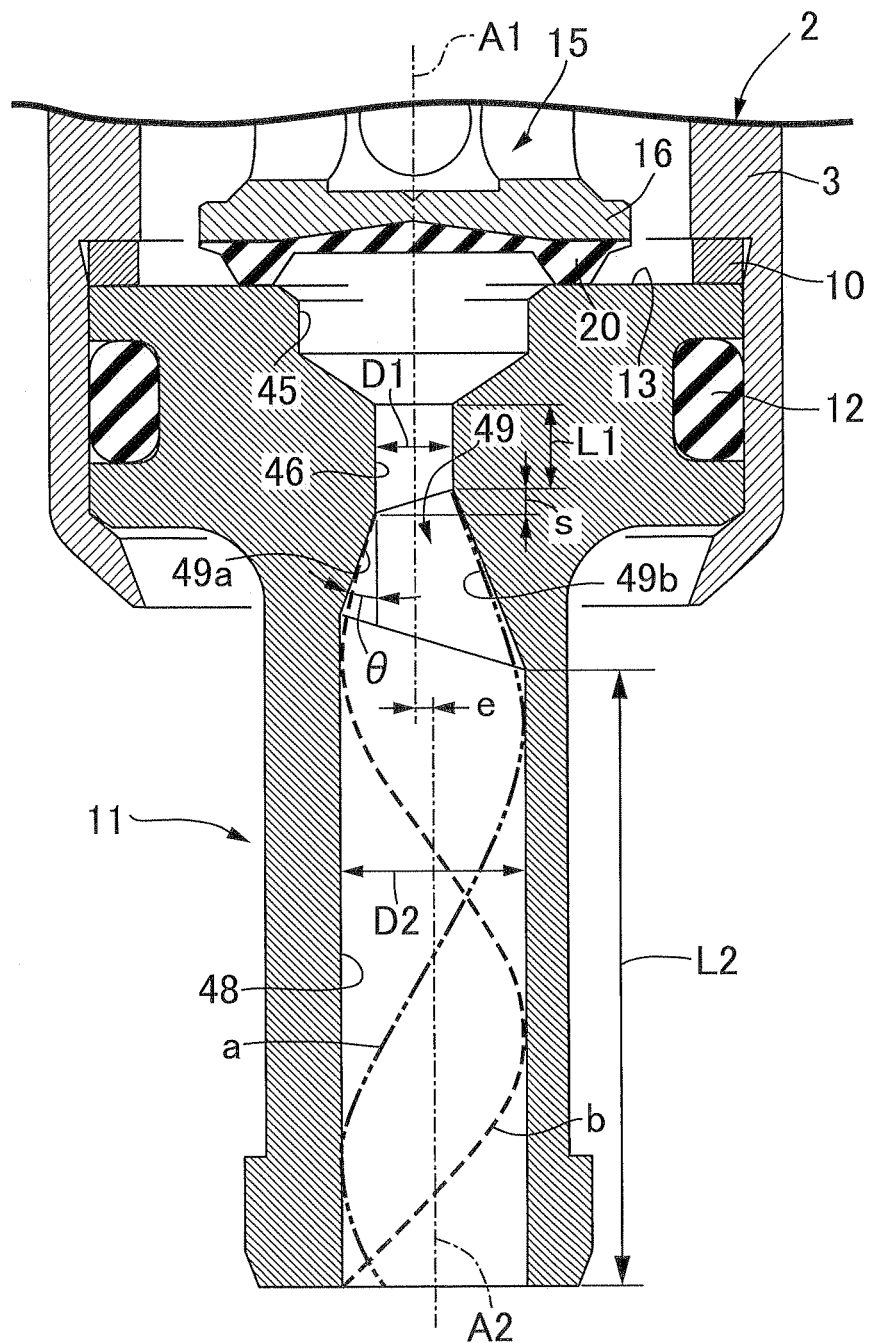
FIG. 6 is a view, corresponding to FIG. 2, showing a third embodiment of the present invention. (third embodiment)
Figure 7:
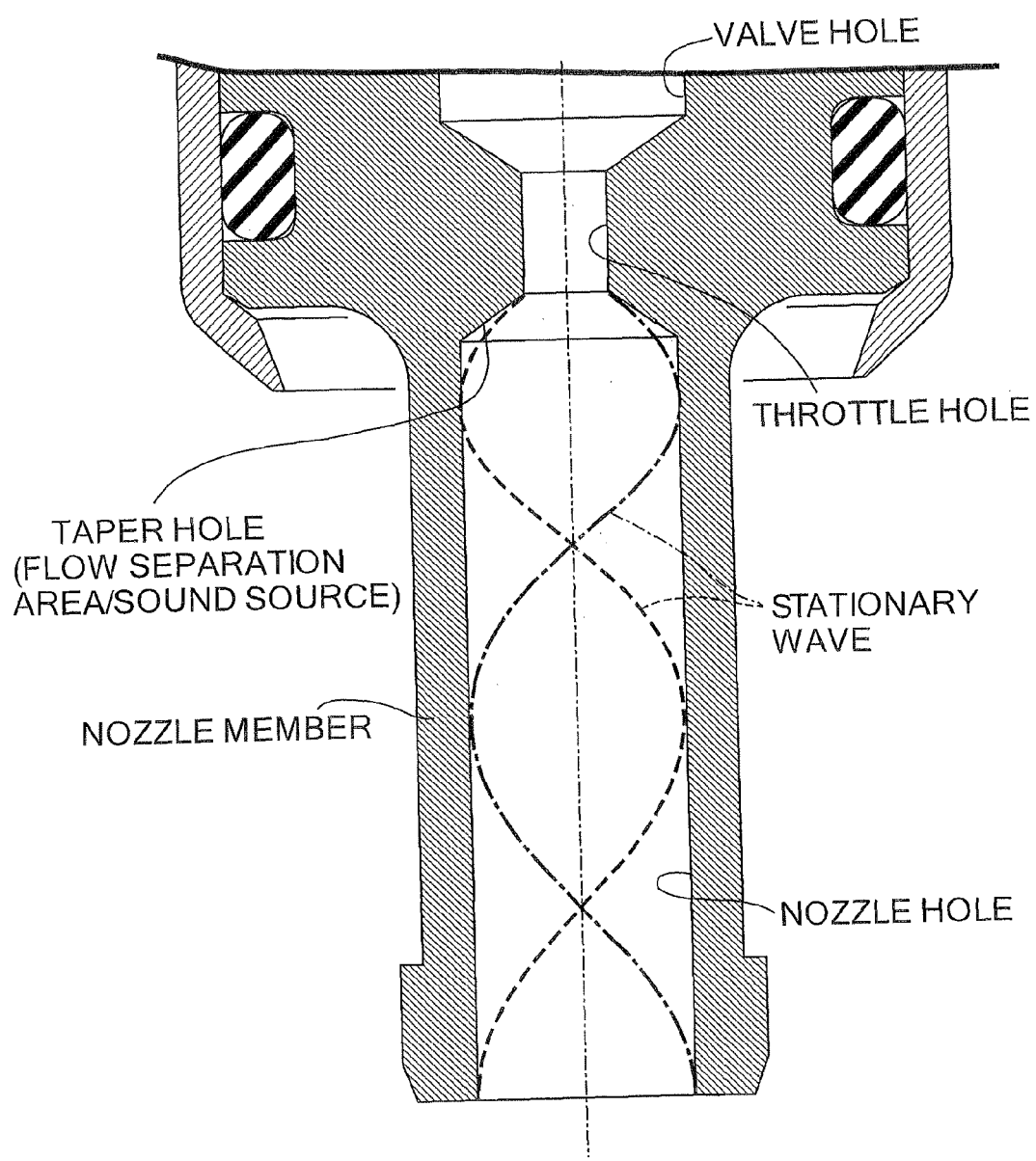
FIG. 7 is a diagram for explaining the mechanism of noise generation in a conventional gas fuel injection valve. (conventional example)

A third embodiment of the present invention shown in FIG. 6 is now explained.

Embodiment 3

In this third embodiment, a nozzle member 11 is provided with a valve seat 13 facing a gas fuel passage 6, a valve hole 45 extending through a central part of the valve seat 13, a throttle hole 46 communicating with an outlet of the valve hole 45 and having a smaller diameter than that of the valve hole 45, and a nozzle hole 48 communicating with an outlet of the throttle hole 46 via a taper hole 49 and having a larger diameter than that of the throttle hole 46.

In this arrangement, the taper hole 49 and the nozzle hole 48 are disposed so that axes A1 and A2 thereof are eccentric to each other by a predetermined amount e. The predetermined amount e is an amount that suppresses the occurrence of a stationary wave, which is described later, in the nozzle hole 48.

Furthermore, when an inclination angle of the taper hole 49 is θ, an internal diameter of the throttle hole 46 is D1, a length of the throttle hole 46 is L1, an internal diameter of the nozzle hole 48 is D2, and a length of the nozzle hole 48 is L2, the throttle hole 46 and the nozzle hole 48 are formed so as to satisfy expressions (1), (2) and (3) above.

The arrangement is otherwise the same as that of the embodiment above, in FIG. 6 parts corresponding to those of the embodiment above are designated by the same reference numerals and symbols, and duplication of the explanation is omitted.

When a valve body 15 opens, gas fuel that has been held in readiness in a guide hole 9 passes through the valve seat 13, is metered by the throttle hole 46, then rapidly flows into the nozzle hole 48 via the taper hole 49, and is supplied to an engine via a gas fuel guide pipe 50. It is assumed that, in this process, gas fuel flow separation at an inner face of the taper hole 49 occurs, and sound waves are thereby generated. Since the taper hole 49 is eccentric to the nozzle hole 48 by the predetermined amount e, portions 49a and 49b, opposing in the direction of eccentricity, of the inner peripheral face of the taper hole 49 are offset from each other by a constant distance s in the axial direction of the taper hole 49, a phase displacement corresponding to the constant distance s is caused between incoming waves a and b transmitted from these opposing portions 49a and 49b to the nozzle hole 48, interference thereof enables the generation of a stationary wave to be prevented, and the emission of noise from the nozzle hole 48 can be suppressed effectively. It is therefore possible to prevent the generation of noise within the nozzle hole 48 and contribute to the provision of a silent gas fuel injection valve I.

Moreover, since the inclination angle θ of the taper hole 49 is set so as to satisfy expression (3) above, that is, 0°<θ≤15°, it is possible to make it difficult for gas fuel flow separation to occur in the taper hole 49, thus further suppressing the generation of noise (see FIG. 5).

Furthermore, since the throttle hole 46 and the nozzle hole 48 are formed so as to satisfy expression (1) above, that is, L1/D1>1, it is possible to straighten gas fuel flow in the throttle hole 46, stabilize metering of the fuel flow rate, and minimize the occurrence of a flow separation phenomenon in the taper hole 49.

Moreover, since the throttle hole 46 and the nozzle hole 48 are formed so as to satisfy expression (2) above, that is, 1<D2/D1≤1.2, it is possible to suppress effectively the occurrence of a flow separation phenomenon, and consequently cavitation, in the taper hole 49 (see FIG. 3).

The present invention is not limited to the above-mentioned embodiment and may be modified in a variety of ways as long as the modifications do not depart from the spirit and scope thereof.

The invention claimed is:

1. A gas fuel injection valve in which a single nozzle member is fixedly provided in a front end part of a valve housing that has an interior thereof as a gas fuel passage and houses a valve body, and this nozzle member has formed therein a valve seat facing the gas fuel passage, a valve hole extending through a central part of the valve seat and being opened and closed by cooperation between the valve body and the valve seat, a straight throttle hole having a constant internal diameter that is smaller than that of the valve hole and communicating with an outlet of the valve hole, and a nozzle hole having a larger diameter than that of the throttle hole and communicating with an outlet of the throttle hole, wherein when the internal diameter of the throttle hole is D1, a length of the throttle hole is L1, an internal diameter of the nozzle hole is D2, and a length of the nozzle hole is L2, $$L1/D1 > 1 \quad (1)$$

$$1 < D2/D1 \leq 1.2 \quad (2)$$

the throttle hole and the nozzle hole are formed so as to satisfy expressions (1) and (2) above.

2. The gas fuel injection valve according to claim 1, wherein
the throttle hole and the nozzle hole are connected to each other via a taper hole, and when an inclination angle of the taper hole is θ, $$0° < \theta \leq 15° \quad (3)$$

the taper hole is formed so as to satisfy expression above.

3. A gas fuel injection valve in which a single nozzle member is fixedly provided in a front end part of a valve housing that has an interior thereof as a gas fuel passage and houses a valve body, and this nozzle member has formed therein a valve seat facing the gas fuel passage, a valve hole extending through a central part of the valve seat and being opened and closed by cooperation between the valve body and the valve seat, a straight throttle hole having a constant internal diameter that is smaller than that of the valve hole and communicating with an outlet of the valve hole, and a nozzle hole having a larger diameter than that of the throttle hole and communicating with an outlet of the throttle hole, wherein the throttle hole and the nozzle hole are connected to each other via a taper hole, and when the internal diameter of the throttle hole is D1, a length of the throttle hole is L1, and an inclination angle of the taper hole is θ, $$L1/D1 > 1 \quad (1)$$

$$0° < \theta \leq 15° \quad (3)$$

the throttle hole, the nozzle hole, and the taper hole are formed so as to satisfy expressions (1) and (3) above.

4. The gas fuel injection valve according to claim 3, wherein
when the internal diameter of the throttle hole is D1 and an internal diameter of the nozzle hole is D2, $$1 < D2/D1 \leq 1.2 \quad (2)$$

the throttle hole and the nozzle hole are formed so as to satisfy expression (2) above.

5. A gas fuel injection valve in which a single nozzle member is fixedly provided in a front end part of a valve housing that has an interior thereof as a gas fuel passage and houses a valve body, and this nozzle member has formed therein a valve seat facing the gas fuel passage, a valve hole extending through a central part of the valve seat and being opened and closed by cooperation between the valve body and the valve seat, a straight throttle hole having a constant internal diameter that is smaller than that of the valve hole and communicating with an outlet of the valve hole, a nozzle hole having a larger diameter than that of the throttle hole and communicating with an outlet of the throttle hole, and a taper hole providing a connection between the throttle hole and the nozzle hole, wherein the throttle hole and the nozzle hole are disposed so as to be eccentric to each other, and when an inclination angle of the taper hole is θ, $$0° < \theta \leq 15° \quad (3)$$

the taper hole is formed so as to satisfy expression (3) above.

6. The gas fuel injection valve according to claim 5, wherein
when an internal diameter of the throttle hole is D1, a length of the throttle hole is L1, an internal diameter of the nozzle hole is D2, and a length of the nozzle hole is L2, $$L1/D1 > 1 \quad (1)$$

$$1 < D2/D1 \leq 1.2 \quad (2)$$

the throttle hole and the nozzle hole are formed so as to satisfy expressions (1) and (2) above.

7. The gas fuel injection valve of claim 5, wherein opposing portions of the taper hole connected to the throttle hole are offset from each other in the axial direction of the taper hole.

8. The gas fuel injection valve of claim 5, wherein a longitudinal axis of the throttle hole is offset from a longitudinal axis of the nozzle hole by a predetermined distance.

9. The gas fuel injection valve of claim 1 wherein said valve hole extends from the valve seat on a downstream side of the valve seat.

10. The gas fuel injection valve of claim 3 wherein said valve hole extends from the valve seat on a downstream side of the valve seat.

11. The gas fuel injection valve of claim 5 wherein said valve hole extends from the valve seat on a downstream side of the valve seat.

* * * * *